Aug. 5, 1947.  E. L. STROMBERG  2,425,014
DEPTH PERCEPTION APPARATUS WITH MEANS FOR DROPPING TARGET
ELEMENTS AT DIFFERENT DISTANCES FROM THE OBSERVER
Filed Aug. 19, 1944    2 Sheets-Sheet 1
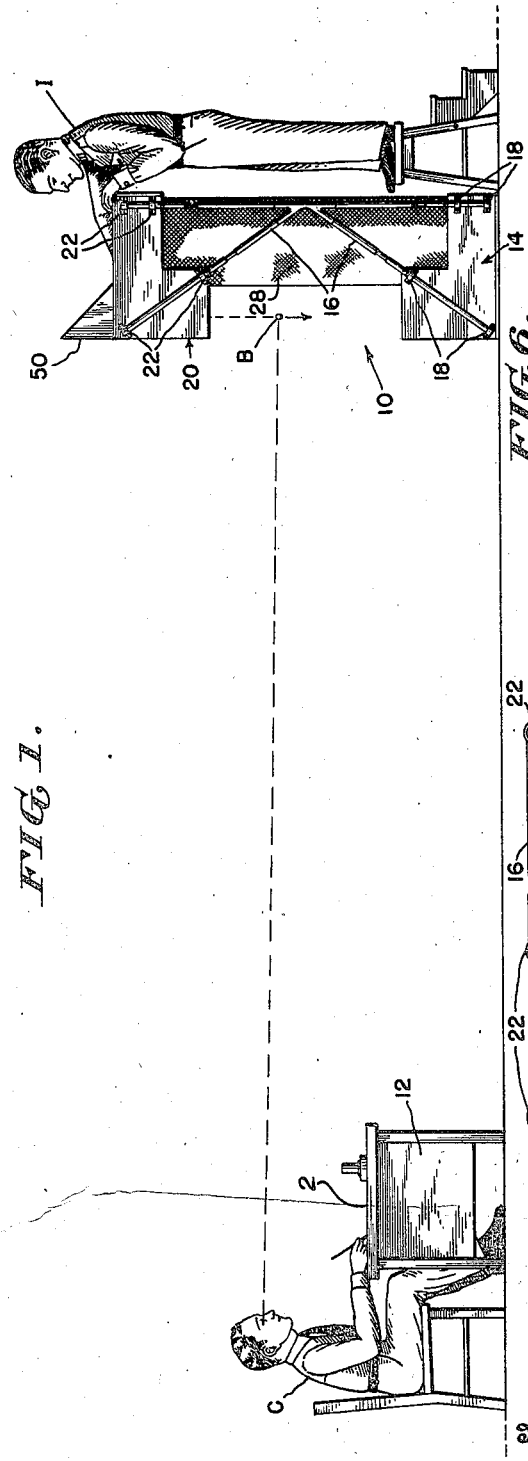
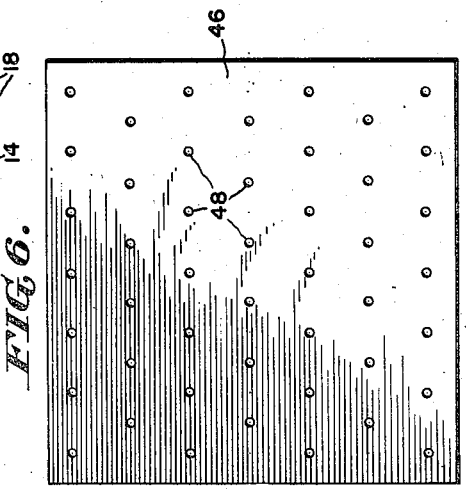
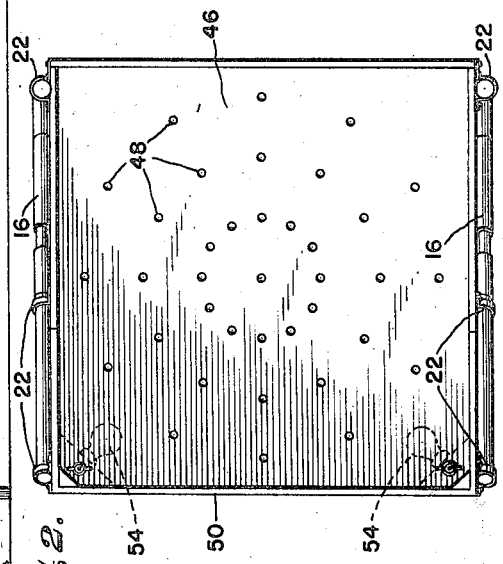
Inventor
E. L. Stromberg
By W Gibson Jones
Attorney Aug. 5, 1947.  E. L. STROMBERG  2,425,014
DEPTH PERCEPTION APPARATUS WITH MEANS FOR DROPPING TARGET
ELEMENTS AT DIFFERENT DISTANCES FROM THE OBSERVER
Filed Aug. 19, 1944  2 Sheets-Sheet 2

Inventor
E. L. Stromberg
By W Glenn Jones
Attorney

Patented Aug. 5, 1947

2,425,014

UNITED STATES PATENT OFFICE 2,425,014

DEPTH PERCEPTION APPARATUS WITH MEANS FOR DROPPING TARGET ELEMENTS AT DIFFERENT DISTANCES FROM THE OBSERVER

Eleroy Leonard Stromberg, United States Navy

Application August 19, 1944, Serial No. 550,293

3 Claims. (Cl. 88—20)

(Granted under the act of March 3, 1883, as amended April 30, 1928; 370 O. G. 757)

This invention relates to physiological optics and more particularly to apparatus for demonstrating and testing visual perception of an object or objects in space.

Depth perception, that is the ability of an observer visually to judge the position of an object in space relative to his own position, is especially important for aviators, particularly when bringing aircraft in for a landing on a terrain devoid of outstanding objects or on the surface of water. Because of a deficiency in the ability to bring the landing surface into the proper perspective, an aviator will frequently dive into the ground or water before he realizes his closeness to the surface. This is costly in life and equipment and hence it is desirable to determine in advance, in some degree, the aptitude of a candidate, for flying, for judging distance, that is, his powers of depth perception, before spending a great deal of time and money in training him in the elements of flying only to find out upon actual flight training that he is below par in this respect.

It is an object of this invention to provide apparatus with which depth perception tests may be given to candidates which is simple, inexpensive and with which tests may be satisfactorily carried out with untrained personnel.

The test of space or depth perception as carried out in accordance with my invention consists of dropping spherical objects one at a time through space for observation by a candidate, his job being to determine the spatial position of each object dropped with respect to a previously dropped object and invention resides in apparatus for carrying out the test comprising a base having uprights fixed thereto which are adapted to support a head above the base. Between the head and base is mounted a wall having a non-reflecting surface in front of which the objects are allowed to fall through space from the head toward the base. A light source is provided in the head which is shielded from the point of observation of the candidate, but illuminates the space in front of the wall. A plurality of openings are formed in the head through which the objects may be dropped in any given pattern and a receptacle is formed in the base to receive the dropped objects.

It is another object of the invention to provide an apparatus for testing the ability of a candidate to judge the actual position of an object in space without the benefit of surrounding objects for comparative purposes. More specifically, the ability to use a combination of past and present experience to judge present position. The use of the apparatus of the invention involves the following steps: seating a candidate before a light absorbing background having a perfectly smooth surface, projecting light upon the background so that the candidate can see the background but no surrounding objects, dropping an object through space in front of the light absorbing background at a given position with respect to the background, and providing the candidate with a chart having indicia thereon corresponding to the position spatially in which the object might be dropped on which the candidate may check or indicate the apparent spatial position of the object as it is dropped for comparison with the actual spatial position in which said object was dropped.

The aforesaid apparatus will now be described in detail with reference to the accompanying drawings, in which:

Fig. 1 shows a side view of the preferred form of my apparatus as used;

Fig. 2 is a top view showing one arrangement of openings through which the test objects are dropped;

Fig. 6 shows another arrangement of openings adapted to be substituted for that shown in Fig. 2.

Figure 3:
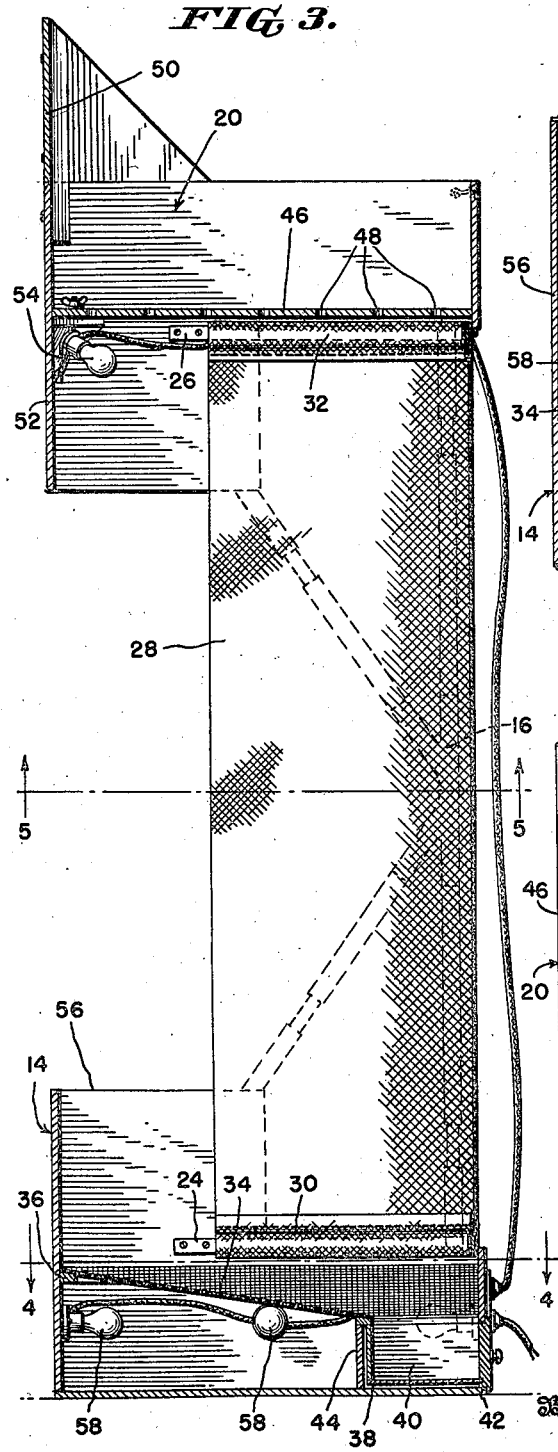
Fig. 3 shows a side elevational, partly in section, of the device.
Figure 4:
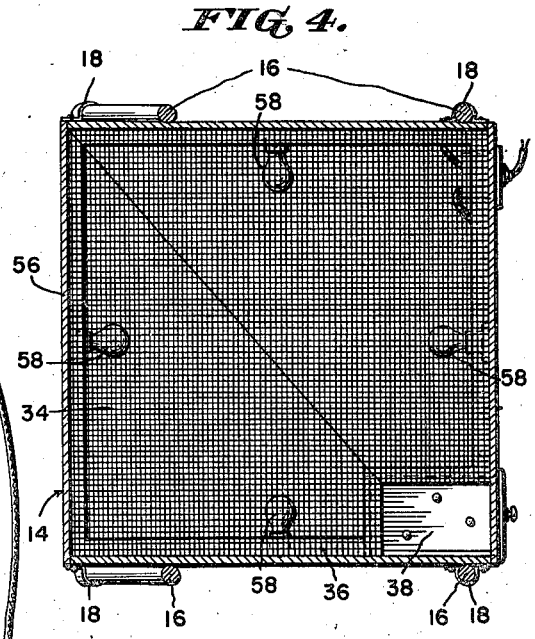
Fig. 4 is a section on the line 4—4 of Fig. 3.
Figure 5:
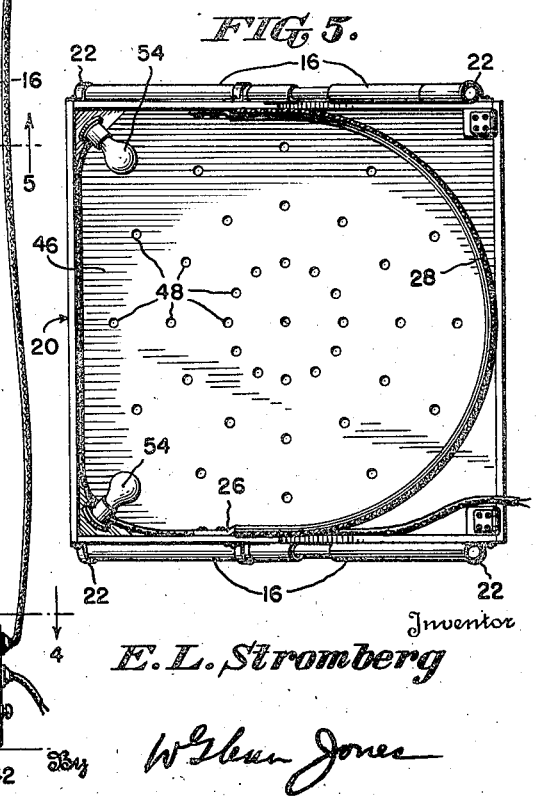
Fig. 5 is a section on the line 5—5 of Fig. 3.

Perception of the location and configuration of an object or objects in space relative to the observer and to each other is made possible by information concerning known objects. This information may be present information, that is visual values being received from known objects at that time and with which unknown objects are compared, visual values retained by memory from past experience or a combination of those.

While the ability to spatially locate objects on the surface of the earth, such as variation in the surface contour of the earth, buildings, trees, etc., is for the average persons, while on the ground, easy, because of the multitude of comparative objects with which he is well acquainted, this ability to judge distance becomes less with any change in normal conditions, such as a reduction in lighting, or excessive reflection, high rates of speed and distance above the earth. All of these factors enter into the problem of depth perception in connection with flying. The loss of space perception is especially pronounced when the observer leaves the surface of the earth in aircraft. At a few hundred feet the majority of objects on or near the surface of the earth appear to be in the same plane and the pilot may have only relatively few prominent objects such as chuch spires, very tall trees, etc., with which to compare his position and these will remain only momentarily within his sight. Hence it is important that a candidate for flying have a keen sense of perception and ability to retain the visual values gained from these fleeting observations to enable him to manipulate his plane with security to himself and his passengers. As heretofore stated, this ability to determine perception is due in part to immediate comparison and in part to past experience, and the method and apparatus of this invention is designed to give the candidate an opportunity to exercise both of these sources of information under conditions which simulate actual conditions.

In accordance with the method, the candidate is seated at a desk 12 (Fig. 1) on which there is placed a chart 2 having indicia thereon. The room preferably is dark or semi-dark and a shaded light may be placed on the desk to enable the candidate to see the chart. At a distance of about twenty feet from the candidate, directly in front of him, an instructor I drops objects B, preferably colored spherical balls from an undiscernible point above the candidate, downwardly in front of a smooth blackened background, that is a background that does not reflect light, hence eliminating any tanglible object from which the eye may obtain visual information for comparison purposes. A source of light is employed to illuminate the background and space through which the balls are dropped, but it is hidden from the view of the candidate. As thus set up, the instructor drops a single ball B through the space and as it falls, the candidate observes its position in space without the benefit of any surrounding objects with which to compare it. To still further prevent any possibility of obtaining clues of the spatial position of the falling object, the position at which it lands is hidden from view. After this trial test, the instructor then drops a series of balls, one at a time in accordance with a predetermined pattern, and the candidate tries to duplicate the spatial position in which they were dropped by the instructor by checking the indicia on his chart 2. The ability of the candidate will depend upon his success in reproducing on his chart the spatial position of the balls as dropped by the instructor with respect to each other and how his results compare with comparison standards based upon average figures obtained by compiling a large number of similar tests of successful, nearly successful and unsuccessful candidates.

The apparatus for carrying out the aforesaid method, as shown in Fig. 1 and indicated generally by reference 10, is placed upright at one end of a room at a distance of about twenty feet from a desk 12 at which a prospective candidate C is seated. The apparatus comprises a base 14 which is a substantially rectangular box, to the opposite walls of which are secured a pair of K-shaped frames 16, the lower ends of which are fastened to the base by clamps 18. The upper ends of the K-shaped frames support a box shaped head 20 which is fastened to them by clamps 22. The base and head are each provided with semi-circular hoops 24 and 26. The opposite ends of the hoops are attached to the opposite inside walls and the bight between the ends extend across the back walls. Between these hoops is stretched a backdrop 28 of light- absorbent material, preferably some textile material which has substantially no reflective properties. For convenience, hems 30 and 32 are formed at the opposite ends of the material so that the backdrop may readily be mounted on the hoops 24 and 26 and freely adjusted thereon to obtain a perfectly smooth surface. While the backdrop 28 is illustrated herein as made of a textile material it is evident that any flexible, semi-flexible or rigid sheet may be employed which may be draped or bent into the shape and which may be treated so as to be substantially non-reflective. The base 14 has near its bottom part adjacent to the lower end of the backdrop 28, a foraminous partition 34 which is supported at its edges on a peripheral ledge 36 fastened to the inside walls of the base, the partition sloping from three of its corners toward the fourth corner. At its lower corner the partition is provided with a rectangular opening 38 which is directly over a drawer 40 inserted in an opening 42 in the back wall of the base, the drawer being surrounded or housed by walls 44. The head 20 is provided with a horizontal wall or partition 46 having a plurality of openings 48 formed therein in any desirable pattern such as shown in Figs. 2 and 6 through which balls may be dropped. The partition 46 is removable so that any one of a number of partitions may be employed having different arrangements of openings therein. A false front or shield 50 is attached to the front wall of the head to prevent the candidate from observing the position in which the instructor drops the balls through the openings in the partition 46. In order to illuminate the space through which the balls fall in front of the backdrop, a pair of lamps 54 are mounted at the front corners of the head in front of the backdrop adjacent to the partition 46. The lamps are hidden from view of the candidate by a shield or skirt 52 which extends downwardly across the front of the head and partway around the sides. This skirt also hides the upper end of the backdrop and hence, prevents the candidate from being able to see the points from which the balls drop. A corresponding shield or skirt 56 is formed on the base to prevent the candidate from observing the points at which the balls strike the partition 34. In order to light the lower part of the backdrop and space through which the balls fall there are provided four lamps 58 located below the partition 34 in the opposite walls in a position to throw light upwardly through the partition.

In operation, the candidate C is seated at the desk 12 with a chart before him on the desk having indicia thereon corresponding to the arrangement of openings in the partition 46. The room is darkened and the instructor drops a ball B which may be white or any other suitable color through one of the openings 48 in the partition 46 and the candidate observes the ball as it drops from the head to the base against the black background 28. Then the instructor having selected some prearranged pattern, of which he keeps a record, drops a series of balls through the openings in accordance with the preselected pattern and the candidate attempts to duplicate on his chart the spatial position in which each one of these balls is dropped. As the balls land on the partition they roll into the drawer 40 and are removed from the bottom of the device for reuse by pulling out the drawer 40.

The invention described herein may be manufactured and used by or for the Government of the United States of America for governmental purposes without the payment of any royalties thereon or therefor.

What is claimed is:

1. A device for use in testing the ability of an individual to determine the spatial position in depth of an object dropped through space for observation, comprising a vertical wall having a substantially non-reflecting surface, a horizontal wall mounted adjacent the upper end of the vertical wall and extending forwardly thereof, said horizontal wall having a plurality of holes therein disposed in a predetermined pattern at different spatial locations relative to the vertical wall and at different distance therefrom through which objects may be dropped from a position near the top of the wall downwardly in front of the non-reflecting surface, a light source mounted in a position to direct light toward said non-reflecting surface, means for shielding said source of light except for the rays directed toward the non-reflecting surface, and means for receiving the objects dropped through the holes in said horizontal wall.

2. A device for use in testing the ability of an individual to determine the spatial position in depth of an object dropped through space for observation, comprising a base, uprights fixed to said base, a head supported above the base on the upper ends of said uprights, a vertical wall having a non-reflecting surface extending between the head and the base, a light source mounted in said head in front of said wall in a position to illuminate the space in front of said wall, a horizontal partition in said head extending forward of said wall and having a plurality of holes therein disposed in a specific pattern at different spatial locations relative to said wall through which holes objects may be dropped through the space in front of the wall, and a receptacle in the base adapted to receive the objects dropped through the partition, said horizontal partition being removably mounted in said head for substitution of a partition having a different pattern of holes.

3. A device for use in testing the ability of an individual to determine the spatial position in depth of an object dropped through space for observation, comprising a base, uprights fixed to said base, a head supported above the base on the upper ends of said uprights, a vertical wall having a non-reflecting surface extending between the head and the base, a light source mounted in said head in front of said wall, a horizontal partition in said head extending forwardly of said wall and having a plurality of holes therein disposed in a specific pattern at different spatial locations relative to said wall through which holes objects may be dropped through the space in front of said wall, and a receptacle in the base adapted to receive the objects dropped through the partition, said horizontal partition being removably mounted in said head for substitution of a partition having a different pattern of holes, shield means to prevent the individual from observing the position at which the objects start to drop and shield means to prevent the individual from observing the points at which the objects strike at the end of the drop.

ELEROY LEONARD STROMBERG.

REFERENCES CITED

The following references are of record in the file of this patent:

UNITED STATES PATENTS

| Number | Name | Date |
| --- | --- | --- |
| 1,796,153 | Hoover | Mar. 10, 1931 |
| 1,843,237 | McGiffert | Feb. 2, 1932 |
| 2,033,634 | Highley | Mar. 10, 1936 |
| 2,340,856 | Ames, Jr. | Feb. 8, 1944 |
| 1,683,808 | Rowe et al. | Sept. 11, 1928 |
| 2,297,993 | Tratsch | Oct. 6, 1942 |
| 827,626 | Gillet | July 31, 1906 |

FOREIGN PATENTS

| Number | Country | Date |
| --- | --- | --- |
| 637,161 | Germany | 1936 |
| 22,331 | Great Britain | 1911 |

OTHER REFERENCES

Helmholtz's Physiological Optics, vol. III, Optical Society of America, copyright 1925, pages 318, 380.

Aviation Medicine; Bauer 1926, pages 12-15, plate opposite page 12.

Manual of Mental and Physical Tests, Whipple, Simpler Tests, 1924, pages 291-293.